United States Patent

Rhodes et al.

Patent Number: 5,947,458
Date of Patent: Sep. 7, 1999

[54] APPARATUS FOR AN ACTIVE SUSPENSION SYSTEM

[75] Inventors: Larry K. Rhodes, Pekin; Steven M. Shaffer, Peoria, both of Ill.

[73] Assignee: Caterpillar Inc., Peoria, Ill.

[21] Appl. No.: 08/891,777

[22] Filed: Jul. 14, 1997

[51] Int. Cl.$^6$ .................................................. F16F 5/00
[52] U.S. Cl. ............................... 267/140.14; 267/140.13; 280/5.503
[58] Field of Search .................. 267/140.14, 140.15, 267/140.13, 5.507; 280/5.503, 124.16, 124.159

[56] References Cited

U.S. PATENT DOCUMENTS

| | | | |
|---|---|---|---|
| 3,920,231 | 11/1975 | Harriston et al. | 267/35 |
| 4,248,447 | 2/1981 | Hart | 280/112 |
| 4,352,487 | 10/1982 | Shtarkman | 267/35 |
| 4,373,758 | 2/1983 | Livesay | 305/22 |
| 4,411,447 | 10/1983 | Hart | 280/714 |
| 4,416,445 | 11/1983 | Coad | 267/35 |
| 4,603,843 | 8/1986 | Bechu | 267/35 |
| 4,743,000 | 5/1988 | Karnopp | 267/218 |
| 4,869,474 | 9/1989 | Best et al. | 267/136 |
| 4,881,609 | 11/1989 | Purcell et al. | 180/9.5 |
| 4,886,251 | 12/1989 | Haussermann | 267/140 |
| 5,098,119 | 3/1992 | Williams et al. | 280/5.507 |
| 5,118,086 | 6/1992 | Stevenson et al. | 267/70 |
| 5,183,243 | 2/1993 | Matsumoto | 267/140.13 |
| 5,316,275 | 5/1994 | Maeno et al. | 267/140.13 |
| 5,388,811 | 2/1995 | Marjoram | 267/140 |

FOREIGN PATENT DOCUMENTS 4301149  7/1994  Germany.

Primary Examiner—Robert J. Oberleitner
Assistant Examiner—Melanie Talavera
Attorney, Agent, or Firm—Calvin Glastetter; O. Gordon Pence

[57] ABSTRACT

An apparatus for an active suspension system provides independent control of each adjustable spring rate mechanism. Ride height, spring rate, and oscillation control are achieved with the use of transducers that send signals to a controller. The controller receives the signals and responsively generates signals to adjust pressure and flow between an accumulator and the adjustable spring rate mechanism.

1 Claim, 1 Drawing Sheet

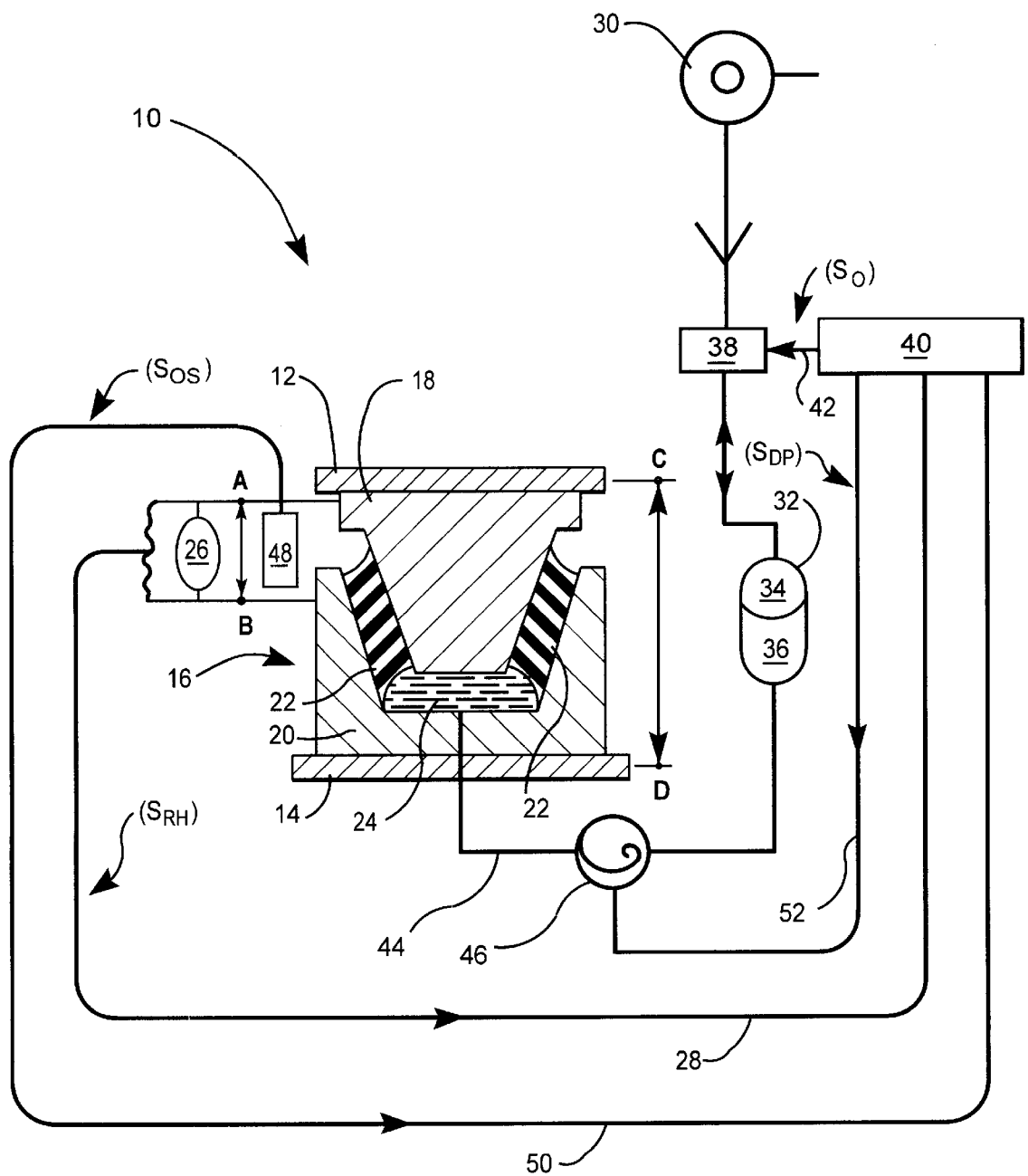

5,947,458

APPARATUS FOR AN ACTIVE SUSPENSION SYSTEM

TECHNICAL FIELD

This invention relates generally to an apparatus for an active suspension system and more particularly to an apparatus for independently controlling each adjustable spring rate mechanism in the active suspension system.

BACKGROUND ART

Machines and vehicles travel on a variety of road and non-road surfaces. These surfaces have varying conditions. For example, some roads are paved and have a generally uniform surface while others are formed of dirt or gravel and are pitted with holes and ruts.

Farm fields and other terrain are considered non-road surfaces and follow the lay of the land. These non-road surfaces include hills and valleys and have a generally non-uniform surface.

The comfort of the operator traveling with the machine or vehicle over the various surfaces is a major concern and one reason why a suspension system is needed. Another reason a suspension system is needed is to assure that the machine or vehicle operates reliably and effectively on the variety of surfaces that must be traveled while being responsive to the driving habits of the operator.

Many suspension systems commonly in use are classified as passive suspension systems. Passive suspension systems react to shocks, loads, and uneven terrain after the machine or vehicle encounters them. Examples of passive suspension systems include struts, springs and resilient pads. Passive suspension systems are limited because they are unable to detect changing conditions and accordingly alter the suspension system before those conditions ultimately affect the ride and performance of the machine or vehicle.

Active suspension systems have been designed to overcome some of the short comings associated with passive suspension systems. For example, U.S. Pat. No. 4,743,000 issued May 10, 1988 to inventor Dean Karnopp discloses an active suspension system that provides slow, continuous adaptation and rapid switch over to greater stiffness augmented by an asymmetrically variable damping and a leveling control means. This system is designed to transfer fluid volume in a piston-cylinder arrangement but does not address suspension systems that utilize other adjustable spring rate mechanisms.

The present invention is directed to overcoming one or more of the problems as set forth above.

DISCLOSURE OF THE INVENTION

In one aspect of the present invention, an active suspension system is disclosed. The active suspension system incorporates an adjustable spring rate mechanism. The adjustable spring rate mechanism has an upper mount and a lower mount with an elastomeric material disposed between the upper and lower mounts. A liquid filled fluid cavity is defined in the adjustable spring rate mechanism by the upper mount, the lower mount, and the elastomeric material.

A position transducer is used to measure a relative distance between the upper and lower mounts and responsively generate a signal representative of a ride height.

A source of pressurized gas is in communication with an accumulator. The accumulator has a first fluid chamber connected to the source of pressurized gas and a liquid filled second fluid chamber which is in fluid communication with the liquid filled fluid cavity of the adjustable spring rate mechanism.

A pressure regulator is operative to selectively control a pressure in the first fluid chamber of the accumulator and actively adjust the spring rate of the adjustable spring rate mechanism.

BRIEF DESCRIPTION OF THE DRAWINGS

The sole FIGURE is a diagrammatic representation of an embodiment of the present invention.

BEST MODE FOR CARRYING OUT THE INVENTION

Referring to the drawing, an active suspension system 10 for adjustably controlling a relative distance, indicated between points A and B, and a relative motion, between a first member 12 and a second member 14 is shown.

The active suspension system 10 includes an adjustable spring rate mechanism 16. The adjustable spring rate mechanism 16 has an upper mount 18 and a lower mount 20. The upper and lower mounts 18,20 can be formed from metallic and non-metallic compositions which are suitable for load bearing applications. An elastomeric material 22 is disposed between the upper mount 18 and the lower mount 20. A liquid filled fluid cavity 24 is defined within the adjustable spring rate mechanism 16 by the upper mount 18, the lower mount 20, and the elastomeric material 22. The adjustable spring rate mechanism 16 is adapted for actively adjusting a spring rate between the upper mount 18 and the lower mount 20.

As illustrated in the drawing, the adjustable spring rate mechanism 16 has a generally conical shape. However, it is recognized that various other shapes can be applied to the adjustable spring rate mechanism 16 without departing from the essence of the invention.

A position transducer 26 is adapted to measure the relative distance A-B between the upper mount 18 and the lower mount 20 and responsively generate a signal representative of a ride height. The signal representative of the ride height is herein after referred to as a ride height signal ($S_{RH}$). In the drawing, the ride height signal ($S_{RH}$) is shown transmitting through a ride height communication link 28. It is recognized however, that the ride height signal ($S_{RH}$) can be transmitted via radio frequency or other suitable means. An alternate embodiment is to have the position transducer 26 adapted to measure a relative distance C-D between the first member 12 and the second member 14 and responsively generate the ride height signal ($S_{RH}$).

A source of pressurized gas 30 is connected to an accumulator 32. The accumulator 32 has a first fluid chamber 34 connected to the source of pressurized gas 30 and a liquid filled second fluid chamber 36 which fluidly communicates with the liquid filled fluid cavity 24 of the adjustable spring rate mechanism 16.

A pressure regulator 38 is operative to selectively control a pressure in the first fluid chamber 34 of the accumulator 32. The pressure regulator 38 is responsive to a change in the ride height signal ($S_{RH}$) and actively adjusts the spring rate of the adjustable spring rate mechanism 16.

A controller 40 is adapted to receive the ride height signal ($S_{RH}$) and responsively generate an output signal ($S_O$) which is delivered to the pressure regulator 38 by way of an output communication link 42. The controller 40, as shown in the drawing, is an electronic controller but can also embody a manual, hydraulic, pneumatic or other type of controller without departing from the essence of the invention.

A fluid conduit 44 is connected between the liquid filled second fluid chamber 36 of the accumulator 32 and the liquid filled fluid cavity 24 of the adjustable spring rate mechanism 16. The fluid conduit 44 is operative to communicate pressurized liquid fluid between the liquid filled second fluid chamber 36 and the liquid filled fluid cavity 24.

A variable orifice 46 is in communication with the fluid conduit 44 and is operative to adjustably control fluid flow between the accumulator 32 and the adjustable spring rate mechanism 16. It is recognized that a suitable valve means could be used in place of the variable orifice 46 without departing from the essence of the invention.

An acceleration transducer 48 is in communication with the upper mount 18 and the controller 40. The acceleration transducer 48 is adapted to detect relative motion of the upper mount 18 and responsively generate and communicate an oscillation signal ($S_{OS}$) to the controller 40. As shown in the drawing, an oscillation communication link 50 is the means of communication between the acceleration transducer 48 and the controller 40. It is recognized that the acceleration transducer 48 can communicate the oscillation signal ($S_{OS}$) to the controller 40 via radio frequency or other suitable means. Additionally, it is recognized that the acceleration transducer 48 could be connected at any suitable location, such as the lower mount 20, the first member 12, or the second member 14, that allows accurate measurement of relative motion.

The controller 40 is in communication with the variable orifice 46 by way of a damping signal ($S_{DP}$) traveling through a damping communication link 52. The controller 40 is adapted to responsively control the variable orifice 46 in response to the oscillation signal ($S_{OS}$). It is recognized that the damping signal ($S_{DP}$) can be electronic, hydraulic, pneumatic, or other suitable means and transmitted by way of a respective communication link.

Industrial Applicability

The active suspension system 10 is well suited for a variety of machines and vehicles. Some examples include track type tractors, wheel loaders, agricultural tractors and combines, on-highway and off-highway trucks and passenger vehicles such as cars, trucks and buses.

One example of an application of the active suspension system 10 is with an agricultural tractor operating in a row crop situation. In this situation, it is important to maintain proper machine ride height so the crops, which are straddled by the tractor, are not damaged as the tractor passes through the rows. Discreet and independent adjustment of each adjustable spring rate mechanism 16 in the active suspension system 10 can be rapidly made to adjust the tractor for optimal operation.

To assure proper machine ride height, the position transducer 26 measures the relative distance A-B between the upper mount 18 and the lower mount 20 of the adjustable spring rate mechanism 16. The position transducer communicates a ride height signal ($S_{RH}$) via ride height communication link 28 to the controller 40. The controller 40 receives the ride height signal ($S_{RH}$) and responsively generates an output signal ($S_O$) to the pressure regulator 38 via output communication link 42. Based on the output signal ($S_O$) from the controller 40, the pressure regulator 38 adjusts accordingly.

If the machine ride height needs to be increased, the pressure regulator 38 allows pressurized gas to flow from the source of pressurized gas 30 into the first fluid chamber 34 of the accumulator 32. The flow of pressurized gas into the first fluid chamber 34 increases the pressure therein and consequently increases the pressure on the fluid in the liquid filled second fluid chamber 36 of the accumulator 32.

The pressurized liquid fluid in the liquid filled second fluid chamber 36 is communicated to the liquid filled fluid cavity 24 of the adjustable spring rate mechanism 16 via fluid conduit 44. An increase in pressurized fluid in the liquid filled fluid cavity 24 increases the height and the spring rate of the adjustable spring rate mechanism 16.

The position transducer 26 continually monitors the relative distance A-B and sends ride height signal ($S_{RH}$) to the controller 40. The continuous ride height monitoring and adjusting when necessary, allows the machine to operate at optimum performance.

Another example of an application of the active suspension system 10 is an off-highway truck operating at a mine site. The truck may be traveling along a mine road of varying surface condition while carrying a full payload of material. As the truck encounters a non-uniform road surface, minimizing oscillations of the truck becomes an important issue.

The acceleration transducer 48 detects the relative motion of the upper mount 18 of the adjustable spring rate mechanism 16. The acceleration transducer 48 responsively generates and directs an oscillation signal ($S_{OS}$) to the controller 40 via oscillation communication link 50. The controller 40 receives the oscillation signal ($S_{OS}$) and responsively generates and directs a damping signal ($S_{DP}$) to the variable orifice 46. The damping signal ($S_{DP}$) is communicated from the controller 40 to the variable orifice 46 via damping communication link 52. The damping signal ($S_{DP}$) adjusts the variable orifice 46 to slow the transfer of fluid between the liquid filled fluid cavity 24 of the adjustable spring rate mechanism 16 and the liquid filled second fluid chamber 36 of the accumulator 32 to minimize oscillation of the truck.

The independent control of each adjustable spring rate mechanism 16 in the active suspension system 10 provides precise and rapid adjustment to enhance machine or vehicle performance while being responsive to the operator's comfort and driving habits.

Other aspects, objects, and features of the present invention can be obtained from a study of the drawings, the disclosure, and the appended claims.

We claim:

1. An active suspension system, comprising:
   an adjustable spring rate mechanism having an upper mount and a lower mount, an elastomeric material disposed between said upper mount and said lower mount, and a liquid filled fluid cavity defined therein by said upper mount, said lower mount, and said elastomeric material, said adjustable spring rate mechanism being adapted for actively adjusting a spring rate between said upper mount and said lower mount;
   a position transducer adapted to measure a relative distance between said upper mount and said lower mount and responsively generate a signal representative of a ride height;
   a source of pressurized gas;
   an accumulator having a first fluid chamber connected to said source of pressurized gas and a liquid filled second fluid chamber in fluid communication with said liquid filled fluid cavity of said adjustable spring rate mechanism;
   a pressure regulator operative to selectively control a pressure in said first fluid chamber of said accumulator in response to a change in said signal representative of a ride height and resultingly actively adjust said spring rate of said adjustable spring rate mechanism;

a controller adapted to receive said signal representative of a ride height and responsively generate an output signal and provide said output signal to said pressure regulator;

a fluid conduit connected between said liquid filled second fluid chamber of said accumulator and said liquid filled fluid cavity of said adjustable spring rate mechanism and operative to communicate pressurized liquid fluid therebetween;

a variable orifice in communication with said fluid conduit and operative to adjustable control fluid flow between said accumulator and said adjustable spring rate mechanism;

an acceleration transducer in communication with said controller and one of said upper mount and said lower mount;

said acceleration transducer is adapted to detect said relative motion of one of said upper mount and said lower mount and responsively generate an oscillation signal and provide said oscillation signal to said controller said controller responsively controls a variable orifice in response to said oscillation signal.

* * * * *

UNITED STATES PATENT AND TRADEMARK OFFICE
CERTIFICATE OF CORRECTION

PATENT NO.   :  5,947,458
DATED        :  September 7, 1999
INVENTOR(S)  :  Rhodes et al.

It is certified that error appears in the above-identified patent and that said Letters Patent is hereby corrected as shown below:

Column 5, line 14, delete "adjustable" and insert "adjustably"

Signed and Sealed this

Twenty-ninth Day of February, 2000

Attest:

Q. TODD DICKINSON

Attesting Officer

Commissioner of Patents and Trademarks